No. 763,996. PATENTED JULY 5, 1904.
C. MOTZ.
VEHICLE TIRE.
APPLICATION FILED DEC. 7, 1903.
NO MODEL.

Witnesses:
P. D. Hall
Miles Hoff

Inventor
Charles Motz

No. 763,996.       Patented July 5, 1904.

UNITED STATES PATENT OFFICE.

CHARLES MOTZ, OF AKRON, OHIO.

VEHICLE-TIRE.

SPECIFICATION forming part of Letters Patent No. 763,996, dated July 5, 1904.

Application filed December 7, 1903. Serial No. 184,092. (No model.)

*To all whom it may concern:*

Be it known that I, CHARLES MOTZ, of Akron, in the county of Summit, State of Ohio, have invented certain new and useful Improvements in Vehicle-Tires; and I hereby declare the following to be a full, clear, and exact description of the invention, reference being had to the accompanying drawings, forming a part of the same, and to the letters of reference marked thereon.

This invention relates to vehicle-tires having a rubber or elastic tread portion, and more particularly to that class wherein the rubber or elastic tread is held in a channeled wheel-rim. It has heretofore been proposed to secure such tires to the wheel by means of a channeled metal rim having generally a flat base and upwardly-extending marginal flanges and inwardly-extending portions, in which channel the rubber tire is seated, said rubber tire being provided with wires extending back and forth in the elastic strip and held in position by the inturned flanges of the rim. It has also been proposed in tires of similar construction to use one circumferential wire in the center of the tire over cross-wires and annular side plates, having inturned flanges of the rim on opposite sides to secure the tire to the rim. I do not know of any tire ever having been proposed having the peculiar and novel details of construction and combination and arrangements of parts, as I will now describe, and point out in the appended claims.

Figure 2:
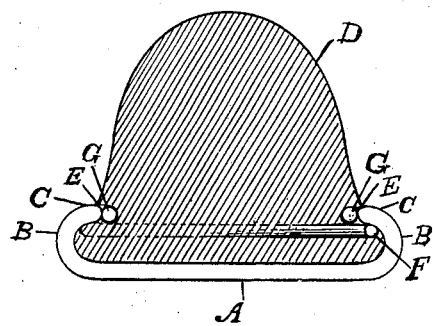
Figure 1:
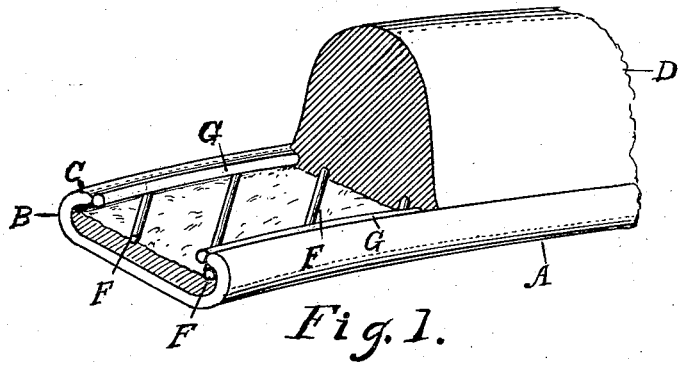

In the accompanying drawings, Figure 1 is a perspective view showing an undercut channeled rim, elastic tire, cross-wires, and circumferential wires. Fig. 2 is a cross-sectional view of the same.

Like letters of reference in both figures indicate the same parts.

The letter A in the accompanying drawings indicates the rim or channel of a wheel, which is secured to the felly in any preferred manner and has upwardly-extending marginal flanges B, with inwardly-extending portions C, thereby forming an undercut channel for the tire. The tire D, of any desired or preferred shape in cross-section, is preferably rubber and has in each side at a suitable distance from the base longitudinally-extending grooves E.

In order to firmly secure the tire D in the undercuts of the channeled rim and to prevent the tire from turning out of the channel by lateral strain, diagonally-extending cross-wires or rigid retainers F are arranged in the same in parallel position and extend under the overhanging portion of the channel C, such construction being entirely practical, because when the tire is being placed within the channel the diagonally-extending wires will yield or give sufficiently with the rubber when pressure is applied so as to allow the tire to enter the channel. It has also been found in solid tires of light construction when used as tractors on a power-propelled vehicle that under severe longitudinal strain the tire stretches and at the same time narrows in cross-section, so as to permit the tire to disengage the undercut portion of the channel. In order to overcome this difficulty, endless circumferential wires G G are placed inside of the channel-rim and over the diagonal cross-wires F outside of the elastic tire.

In operation it will be readily seen that should the tire stretch, and thereby narrow in cross-section, the circumferential wires which rest on the cross-wires must necessarily in the narrowing process draw in with the tire, and thereby preventing the tire from disengaging itself from the channel.

Having thus described my invention, what I claim as new, and desire to secure by Letters Patent, is—

1. In a vehicle-tire the combination with the undercut channeled rim, of the elastic tire having projections adapted to fit said channel-rim, and provided with metallic bars or stays in said projections placed diagonally of the tire in parallel and coöperating at the ends with the inturned flanges of the rim; substantially as described.

2. In a vehicle-tire the combination with the metallic rim having the upwardly and inwardly extending marginal flanges, of the elastic tire formed with longitudinally-extending side grooves with which coöperate the inturned flanges of the rim, metal bars or stays extending diagonally of the tire in parallel and having their ends project under the inturned flanges of the rim; substantially as described.

3. In a vehicle-tire the combination with the rim having hooked lateral edges, of the elastic tire having a portion adapted to fit said rim and provided with diagonally-extending parallel metal bars or retaining-pieces in its inclosed portion having their ends project under the overhanging portion of the rim, and endless circumferential retaining-wires in tension located over or above said cross-wires along each side of the elastic tire.

CHARLES MOTZ.

Witnesses:
WM. WOLF,
WM. A. DURAND.